Figure 1:
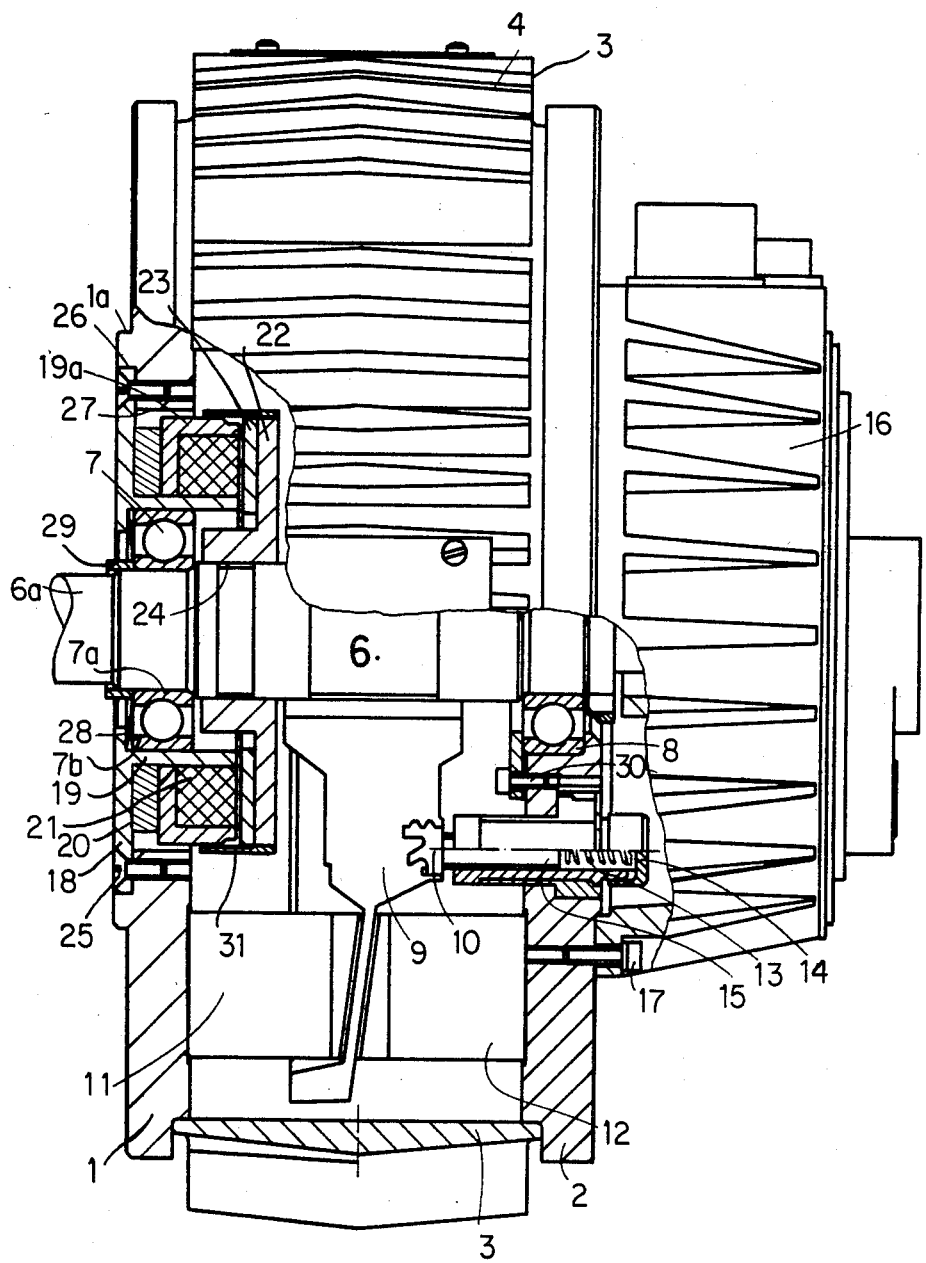

United States Patent [19]

Zahner

[11] Patent Number: 4,560,895
[45] Date of Patent: Dec. 24, 1985

[54] ELECTRIC MOTOR EQUIPPED WITH INNER BLOCKING BRAKE

[75] Inventor: Pierre W. Zahner, Luins, Switzerland

[73] Assignee: Mavilor Systemes S.A., Switzerland

[21] Appl. No.: 549,590

[22] Filed: Nov. 7, 1983

[30] Foreign Application Priority Data

Nov. 9, 1982 [CH] Switzerland .................. 6493/82

[51] Int. Cl.⁴ .............................................. H02K 23/68
[52] U.S. Cl. ........................................ 310/77; 188/162; 310/88
[58] Field of Search ............ 310/77, 102 A, 105, 310/184, 88; 308/196; 188/161, 162, 267

[56] References Cited

U.S. PATENT DOCUMENTS

| | | | |
|---|---|---|---|
| 2,879,417 | 3/1959 | Sorchy | 310/77 |
| 3,351,398 | 11/1967 | Park et al. | 308/196 |
| 3,763,968 | 10/1973 | Noly | 310/77 |
| 3,783,312 | 1/1974 | Schindel et al. | 310/77 |
| 3,885,176 | 5/1975 | Cunningham | 310/88 |
| 4,223,255 | 9/1980 | Goldman et al. | 310/77 |

FOREIGN PATENT DOCUMENTS 2064539  7/1972  Fed. Rep. of Germany .
2211791  7/1974  France .
512852  10/1971  Switzerland .

OTHER PUBLICATIONS

"Der Kleine mit den grossen Möglichkeiten", Konstruktion und Design, May 78, v. 5, pp. 31, 32.

Primary Examiner—Peter S. Wong
Assistant Examiner—D. L. Rebsch
Attorney, Agent, or Firm—Darby & Darby

[57] ABSTRACT

The motor has two motor flanges (1,2) which form the stator with stator magnets projecting axially inward from the inner sides (11,12) of the flanges, the magnets being distributed along a circle coaxial with the motor axis, and a slightly conical rotor (9) in the air space between opposing stator magnets (11,12). On the output side of one motor half, and facing outwardly, is an annular space defined by the stator magnet (11) on the output side of the motor flange (1). A blocking brake (18 to 23) is mounted in a space-saving manner, with the stationary half of the brake (18 to 21) placed in an opening made for it in the outer flange piece (18) in the motor flange (1) and attached to it. The rotating half of the brake (22,23) is attached to the motor shaft (6). In this way, the motor and friction brake form a compact structural unit whose dimensions are not greater than those of an ordinary motor housing.

8 Claims, 2 Drawing Figures

ELECTRIC MOTOR EQUIPPED WITH INNER BLOCKING BRAKE

The invention relates to an electric motor equipped with a blocking brake with axial or conical magnetic field. It has two opposing motor flanges which form part of the stator. On the inner sides of the motor flanges there are several axially projecting stator magnets placed along a circle coaxial with the motor shaft and a rotor placed in the air space between the opposed stator magnets, specifically, a flat or conical rotor.

Direct current motors actuated by permanent magnets of this type in the form of a sliding rotor motor with a rotary magnetic field are common (excerpt from "Konstruktion and Design", volume 5, 1978, pages 31 and 32). They are distinguished by a compact, flat design with very few parts and an exceptionally low moment of inertia in the sliding rotor, and electrical features allowing continuous control of the rate of revolution from nearly zero to rated speed in very short acceleration and braking times; the entire nominal torque is available even at the lowest rate of revolution, for example, at 0.1 rev/min. The sliding rotor generally consists of cast synthetic plastic resin, iron-free, flat or slightly conical rotor with copper winding and multiple distributed level commutators. In spite of its thinness it is very mechanically stable.

On the basis of these design and electrical features these motors are preferred as regulated servomotors for follower control devices and regulators in which a high intake or position precision is needed, as is the case in numerous controlled assembly automatons, robots, observation instruments for astronomy and the like. Adaptation to any existing servo-regulatory system can be done on the output side of the opposed motor flange. Optional tacho-alternators as pick-up for the first revolution and/or an electrically controllable friction brake, above all, as a blocking or shutdown brake can be built on while, on the output side of the motor flange, step-down gearing can be assembled, if desired. A blocking brake which is released only by current, and is effective in a currentless condition, is desired in the preceeding uses since, generally, servomotors with electrical braking always require that the controlled or regulated final control element remain exactly in position when the motor is shut down or if there is a power failure, as is most often the case, for example, with industrial robots.

Permanent magnet constant speed brakes designed as blocking brakes of this type are common and, if needed, can be built on the input of the sliding rotor motors mentioned, outside the actual motor housing as a separate attached part, and even on the output side of the opposite motor flange. This concerns a constant speed brake in which the force of a permanent magnet activates the braking effect, in the course of which an electromagnet is aided by the permanent magnetic field for the purpose of lifting the brake. When the electromagnets, which are continuously jointly in circuit with the motor, are induced, reliable easing of the brakes is guaranteed, supported by the effect of springs on the brake ring forming the brake anchor, which is pulled back in the eased position, and which is overcome by the permanent magnet when the motor is shut down or the electromagnets are disconnected.

Spring pressure sliding brakes are also used as blocking brakes in addition to permanent magnet brakes in which the braking effect on shutdown is produced by springs, whose force, for the purpose of lifting the brake, must be overcome by electromagnets then induced, since the anchor formed by the brake ring is pulled up with adequate braking force.

Blocking brakes of the type described used to be assembled basically as separate attachments on the outside of sliding rotor motors and, of course, if these motors were equipped with a tacho-alternator and/or an impulse generator, installed coaxially with the motor shaft between the output side opposite the motor flange. By so doing, the axial dimensions of the motor system composed of the motor and attachments were enlarged; the number of required shaft couplings which, on the one hand are torsionally rigid and on the other hand, must have a certain axial and radial play were increased and; finally, exchange or adjustment of the brake was complicated, since they were accessible only after the removal of the additional attachment. Furthermore, in the common sliding rotor motors of the type described, the commutator on the side of the rotor facing away on the output side and according the carbon brushes on the motor flange facing away and placed on the output side, must first be disassembled from the brake attached to this motor flange to change these carbon brushes. This is troublesome and time consuming.

The comments on the problems in the preceeding also apply to motors with conical rotors and/or conically oriented magnetic field. If a rotor has a greater degree of conicity, for example, for the purpose of reducing the moment of inertia, then a correspondingly conically oriented magnetic field is advantageous in which the magnetic axes of the stator magnets lie on a conical surface, and so the stator magnets are tilted at a corresponding angle to the motor axis.

The invention solves the problem of constructing an electric motor equipped with a blocking brake of the type described as a compact structural unit whose dimensions are not greater than those of the motor housing and in which the brake is fully integrated.

This problem is solved as a result of the invention, since the blocking brake is completely installed in one half of the motor and is essentially placed in the annular space surrounding the stator magnets of the respective motor flanges. A flange piece consisting of a ferromagnetic material has an inner pole ring projecting out on its inner surface coaxial to the motor shaft. In the center of it is the place for the motor shaft and the induction winding of the electromagnets is situated on its outer circumference.

This development is design for the first time integrates the blocking brake completely in the motor itself. The free annular space inwardly of the stator magnets, which has never previously been used, has been cleverly used to accommodate the brake, and the inner pole ring has been used to receive the motor shaft, preferably in a ball bearing. The dimensions of the new system consisting of the motor and brake are therefore not greater than those of the motor itself. In addition, the brake housing can be eliminated, which in particular reduces the weight.

The flange piece is preferably inserted in an opening in the motor flange, touching it and fastened to it. In this way, the thickness dimension of the motor flange is utilized for accommodating the stationary half of the brake and at the same time assembly, changing and adjustment of the brake are substantially simplified; since after loosening the flange piece, not only the stationary half of the brake is accessible but also the rotating half by means of an opening extending through the motor flange. The blocking brake is preferably built on a common permanent magnet sliding brake in which the flange piece and inner pole ring are in one piece.

Figure 2:
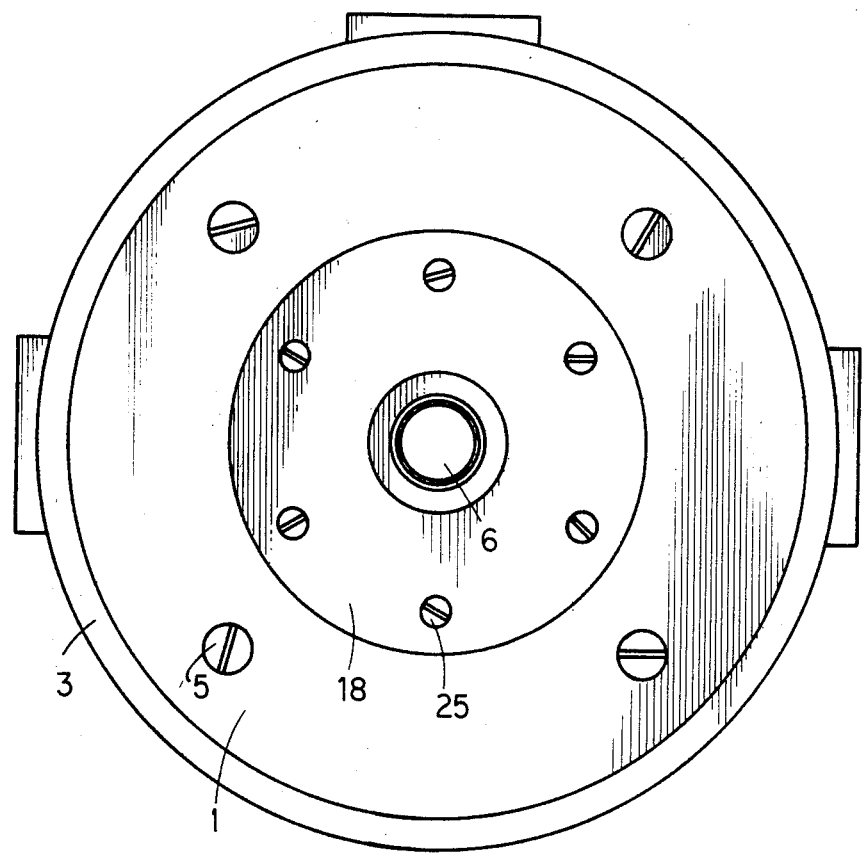

The details of the invention can be seen clearly in the drawings of a sliding rotor motor with a built-in permanent magnet sliding brake. They show:

FIG. 1 is a side-view of the motor with an axial view of the area housing the brake; and FIG. 2 is a top-view of the output side of the motor flange in the direction of the arrow II from FIG. 1.

The housing for the motor illustrated consists of an output side round motor flange 1, a motor flange 2 opposite it and a finished housing ring 3, preferably aluminum. This housing ring is supplied with a cooling vane 4 on which both motor flanges 1 and 2 are fastened with screws 5. The motor shaft 6 has an output end 6a usually coupled with a step down gearing (not shown), with the drive shaft of the controlled or regulated device, shaft 6 being placed in ball bearings 7 and 8. This shaft 6 in the sliding rotor carries a slightly conical plate shaped, synthetic cast plastic rotor 9 with copper winding (not shown) and multiple surface commutators distributed thereon, of which a collector element can be seen in FIG. 1. The slightly conical design gives the rotor high mechanical stability.

On the inward side of each of the motor flanges 1 and 2 are attached axially projecting stator magnets 11 and 12 forming permanent magnets which are arranged equally along a circle coaxial to the motor shaft 6 as schematically shown in FIG. 1. They lie parallel to the motor axis and induce an axial magnetic field. On each of the motor flanges 1 and 2, for example, six or even eight stator magnets 11 and 12 can be placed. The pairwise opposed stator magnets 11 and 12 surround an air space in which the rotor 9 revolves and which is adapted to its slightly conical shape. In addition, on the motor flange 2 is brush holder 13 for the carbon brushes 15, loaded by spring 14, which are pushed against the surface of commutator 10.

In the embodiment considered, there is an attachment 16 on the ouput side of the turned away motor flange 2, which can be, in particular, a tacho-alternator for measuring the first rate of revolution; it is fastened with screws 17. Another attachment could be an impulse generator for measuring the first position.

The motor is equipped with a blocking brake built in the inner motor in accordance with the invention and, in the embodiment considered, with a permanent magnet-sliding brake. The stationary half of the brake consists of a flange piece 18 with a one-piece inner pole ring 19 on it which the annular permanent magnet 20 and an induction winding 21 next to it are placed.

This induction winding 21 and the metal portions comprising flange piece 18, with pole ring 19, constitute the electromagnet of the brake. In order to obtain a closed magnetic flux path which is restricted as much as possible to metal parts, an outer pole ring 19a, having an L-shaped cross-section, is provided in addition to pole ring 19. Outer pole ring 19a is positioned to circumscribe induction winding 21 and to be interposed between that winding and braking permanent magnet 20.

The revolving half of the brake consists of a flanged hub 22 attached to the motor shaft 6, preferably of aluminum, and on which brake or friction ring or anchor 23 sits on the flange hub 22 and is loaded in the sense that the brake is eased. Anchor 23 can move axially but cannot rotate with respect to hub 22. The flange hub 22 is, as is the rotor 9, pressed on a tolerance ring 24, which is fitted within a ring channel of the motor shaft 6 on Flange hub 22 is thereby fastened by force fit on motor shaft 6. This force fit joins the revolving half of the brake with the motor shaft 6 in a simple way and secures them against mutual rotation. Since the flange hub 22 consists appropriately of aluminum, the intermediate surface between this and tolerance ring 24 is preferably provided with a steel case, not shown.

The round formed flange piece 18 of the stationary half of the brake is placed in the opening hollowed out in the area of the output side of the motor flange 1 and is fastened to it with screws 25. The surrounding inner wall of the motor flange opening is formed in steps with the diameter of the outer step 26 larger than the inner step 27. The flange piece 18 is as thick as the outer step 26, so that the outer surface of the flange piece 18 and that of the motor flange 1 are level. The screws 25 attach in the surrounding wall area of the motor flange 1 of the inner step 27.

The output side of ball bearing 7 has its outer ring 7b sitting with sliding friction on the inner surrounding surface of the pole ring 19 and activates a spring 28, which this outer ring 7b attempts to press in the direction of the inner motor. The inner ring 7a of the ball bearing 7 is attached to pressure to the motor shaft 6 and is axially immovable. On the outside of motor shaft 6 sits a steel ring 29

Similarly, the outer ball bearing 8 is unable to move axially; its outer ring is fastened by screws 30 to the motor flange 2. The axial position of the outer ring 7b of the ball bearing 7 allows a certain deflection from the effect of axial forces, above all, from thermal expansion. The outer ring 7b does not rotate with the motor shaft 6. Direct seating of the outer ring 7b on the inner area of the inner pole ring 19, as well as integration of the flange piece 18 and the pole ring 19, has the advantage that radial forces, especially radial oscillations of the motor shaft 6 are transferred across the pole ring 19 and the flange piece 18 to the motor flange 1 and absorbed by them.

In order to prevent dust, especially graphite dust rubbed off the carbon brushes 15, from penetrating the braking aperture, a protective dust cover 31 is pressed on the circumference of the flange hub 22 on the rotating half of the brake which covers the braking aperture, and overlaps, without touching, part of the induction winding 21 of the stationary half of the brake with minimal play.

The permanent sliding magnet brake described operates in the following manner: The brakes are in the braking position when the motor is not operating, i.e. the anchor 23, by means of the permanent magnets 20, opposes the effect of the lifting springs, not shown, and is pressed axially against the pole surfaces of the pole rings 19, 19a which can be given a suitable friction lining. In order to cancel the braking effect and to ease the brake the induction winding 21 is activated, as a result of which the magnetic field of the electromagnets now induced counteracts the permanent magnetic field of the permanent magnets 20, so that the anchor 23 is lifted axially away from the pole surface of the pole ring 19 by the effect of the lifting springs and is moved to its lifted position. The brake operates as a blocking or shutdown brake and for this purpose is combined with an induction winding 21 of the type on the motor circuit or the feeder circuit so that this induction winding 21 is always induced when the motor is started. In a currentless situation such as when the motor is not operating or during a power failure, the brake is constantly effective so that equipment driven by the motor does not change its position, which is particularly important for industrial robots.

The motor and integrated brake form a compact unit whose dimensions correspond to those of the motor itself, because the free annular space within the stator magnets 11 and the opening made in the motor flange 1 are used to house the brake. In this way, the brake is also easily accessible since only the screws 25 holding the flange piece 18 need be loosened. This simplifies substantially changing or eventual necessary adjustment of the brake, since no motor flange need be disassembled. Disassembly of the motor generally requires prior demagnetization of the stator magnets, because the type of permanent magnet generally used in sliding rotor motors of the type considered are first magnetized in the assembled motor, and each disassembly of the motor requires demagnetization. For this purpose, all stator magnets have a special winding (not shown) for magnetization and demagnetization.

Because the brake is build-in, the previously required brake housing is unnecessary, saving considerable weight.

If the motor, according to the invention, is operated without additional attachments, for example in the design example considered, without the attached tachoalternator 16, then it has the further advantage that the carbon brushes 15 are accessible for changing, directly on the motor flange 2.

The invention is not limited to the specific embodiment described but, with regard to the design of the brake and of the motor as well as the type of motor, can have many variations. For example, the brake permanent magnet can also be fastened to the revolving half of the brake; however, in order to keep the moment of inertia of the revolving part as small as possible the design described in FIGS. 1 and 2 is generally the best. In place of a permanent magnet sliding brake a common spring pressure sliding brake liftable by means of electromagnets can be built in the motor as a blocking brake. If necessary, the brake can also be attached to the inner side of the motor flange, if the output side of the motor flange is not bored out, so that its total axial dimension lies in the annular space surrounded by the projecting stator magnets 11.

In the example considered, the motor flange 1 has a ring formed step 1a on its outer side intended as a centering diameter for balancing the attachment of additional components of the motor inset. The placement can be done so that the round flange piece 18 on the outer side of the motor flange 1 projects and so defines the centering ring with its projecting outer circumference which can be neglected on the motor flange itself.

In addition to the design example with the motor described with a slightly conical rotor and axial magnetic field, also motors with a flat rotor, with more or fewer conical rotors and with a conically oriented magnetic field as well as all other types of motors are covered by the invention. Those motors in which the geometry of the stator magnets projecting axially on the motor flange allow the brake to be housed in the annular space defined by these magnets, whereby the stator magnets in principle deal with electromagnets, especially with controllable induction, also.

What is claimed is:

1. Electric motor equipped with a blocking brake and having a magnetic field running at least partially axially, said motor having two flanges lying axially opposite one another to form a stator and to define axial outer boundaries for said motor, axially inwardly projecting stator magnets positioned on each flange along a circle coaxial to a motor shaft, and a rotor in an air space between the opposing stator magnets, the blocking brake being a disc brake biased in the braking condition and including an electromagnet for easing the brake by counteracting the brake action when activated, comprising:

said blocking brake being installed completely within one axial half of the motor essentially in an annular space circumscribed by the stator magnets of one motor flange;
    a flange piece made of a ferromagnetic material mounted to said one motor flange to define a stationary portion of the brake; and
    an inner pole ring formed on said flange piece coaxially with said motor shaft and being adapted to rotatably receive the motor shaft, an induction winding of the electromagnet being disposed about said pole ring.

2. Motor according to claim 1, in which the flange piece is fitted in an opening made for it in the motor flange and fastened to it with screws.

3. Motor according to claim 2, in which the opening of the motor flange has an inner wall having an outer step and an inner step of smaller diameter than the outer step, the flange piece of the stationary portion of the brake being disposed only in the outer step.

4. Motor according to claim 1 in which the stationary portion of the brake has a permanent magnet in addition to the electromagnet on the inner pole ring, a rotating portion of the brake including and being situated on a coaxial flange hub fastened to the motor shaft, the flange hub having a radially projecting flange, and a friction ring mounted for axial movement between said hub flange and said inner pole, but being fixed against rotation with respect to said hub, the flange piece and the inner pole ring being made in one piece.

5. Motor according to claim 2, in which the flange piece is fitted in an opening of the motor flange which includes an inner wall having an outer step and an inner step of smaller diameter than the outer step, the flange piece of the stationary portion of the brake being disposed only in the outer step, ball bearing means for receiving said shaft, at least a part of which is mounted within said inner pole ring and is constructed to be retained therein by means of a friction fit, the one-piece part comprising the flange piece and pole ring being constructed and arranged to transfer radial forces, especially oscillations of the shaft, to the motor flange.

6. Motor according to claim 4, further comprising a generally cylindrical dust cover mounted on the periphery of the hub flange of the rotating portion of the brake and extending axially therefrom to cover the friction ring part of the stationary portion of the brake, which it overlaps with minimal play.

7. Motor according to claim 1 in which the rotor has a commutator on one side, the brake in the motor half faces away from the commutator and this half of the motor faces the output side of the motor.

8. In an electric motor having a predefined axis of rotation and friction brake, the motor being constructed to have a magnetic field therein oriented at least partially axially, said motor comprising:

axially spaced, opposed flanges defining axial outer boundaries of a housing for said motor;

axially inwardly projecting magnets positioned on at least one of said flanges and about said axis to define a magnetic component of said motor;

an electrical component of said motor mounted for rotation about said axis relative to said magnetic component at a position intermediate said flanges; and said friction brake being selectively electrically actuable and being disposed entirely within said motor housing essentially in an annular space circumscribed by the magnets.

* * * * *